United States Patent [19]

Van Nes

[11] 4,025,811

[45] May 24, 1977

[54] LIQUID-COOLED HIGH PRESSURE METAL VAPOR DISCHARGE LAMP IN PARTICULAR TO BE USED IN A METHOD OF MANUFACTURING A COLOR TELEVISION DISPLAY TUBE

[75] Inventor: Johannes Cornelis Adrianus Van Nes, Eindhoven, Netherlands

[73] Assignee: U.S. Philips Corporation, New York, N.Y.

[22] Filed: Oct. 29, 1975

[21] Appl. No.: 626,617

[30] Foreign Application Priority Data

Nov. 27, 1974 Netherlands ...................... 7415440

[52] U.S. Cl. .......................... 313/22; 240/41.35 E; 240/103 B; 313/113; 354/1

[51] Int. Cl.² .................. F21V 29/00; G03B 41/00; H01J 7/26; H01J 5/16

[58] Field of Search .............................. 313/22–24, 313/35, 36, 113; 240/41.35 R, 41.35 E, 103 R, 103 B; 354/1; 96/36.1

[56] References Cited

UNITED STATES PATENTS

| | | | |
|---|---|---|---|
| 2,936,682 | 5/1960 | Krawitz | 354/1 |
| 2,977,492 | 3/1961 | Hoekstra | 313/22 |
| 3,596,125 | 7/1971 | Seigel | 313/22 |
| 3,603,827 | 9/1971 | Degawa et al. | 313/36 X |

*Primary Examiner*—Siegfried H. Grimm
*Attorney, Agent, or Firm*—Frank R. Trifari; Robert S. Smith

[57] ABSTRACT

A liquid-cooled high-pressure metal vapor discharge lamp, to be used in particular in a method of manufacturing a color television display tube in which a cooling jacket is secured around the discharge tube and on which a thin metal mirror is provided on the inside. The mirror comprises apertures through which light rays of a given intensity as a function of the location emanate without disturbing reflections.

6 Claims, 4 Drawing Figures

Figure 1:
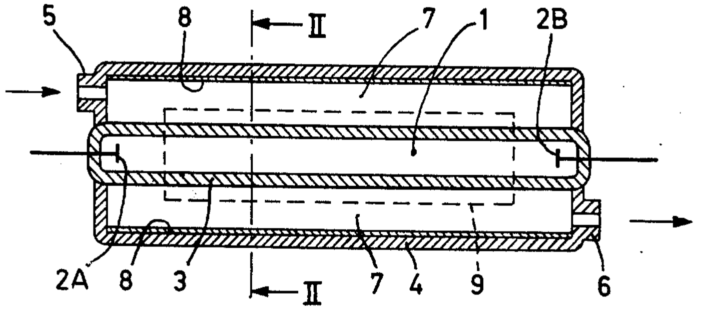

LIQUID-COOLED HIGH PRESSURE METAL VAPOR DISCHARGE LAMP IN PARTICULAR TO BE USED IN A METHOD OF MANUFACTURING A COLOR TELEVISION DISPLAY TUBE

The invention relates to a liquid-cooled high pressure metal vapour discharge lamp comprising a discharge tube surrounded by a cooling jacket having an inlet aperture and outlet aperture, a cylindrical mirror being arranged inside said cooling jacket around the axis of the discharge tube. The invention furthermore relates to a method in which such a lamp is used for manufacturing a cathode ray tube of the shadow mask type for displaying colored pictures, as well as to a cathode ray tube manufactured according to such a method.

Such a liquid-cooled high pressure metal vapor discharged lamp is known from the U.S. Pat. Specification No. 2,977,492 in which the said cooling jacket is formed by the holder which comprises the discharge tube of the metal vapor discharge lamp. Accommodated in said cooling jacket is also a cylindrical mirror which should have a particular position relative to the discharge and hence the discharge tube. For that purpose the discharge tube is positioned in the cooling jacket so as to be adjustable. Via the said inlet and outlet apertures a liquid circulates through the cooling jacket and cools both the holder and the discharge tube.

Such a light source may be used in a device for manufacturing a phosphor pattern on the display screen of a cathode ray tube for displaying colored television pictures. In particular for color television tubes in which three electron guns are arranged in one row beside each other. The phosphor pattern in such a tube consists of parallel vertical strips of phosphors luminescing alternately blue, green and red, between which strips of a light absorbing material may be present. The colour selection electrode arranged immediately in front of the display screen comprises long, narrow apertures which extend parallel to the phosphor strips and through which the electron beams originating from the electron guns emerge and impinge upon the phosphor strips. The color selection is obtained by causing the electron beam originating from one given electron gun to impinge upon phosphor lines of one color. This may be done by causing the three electron beams to enclose a small angle with each other, the so-called color selection angle, and by giving the apertures in the color selection electrode an accurately determined position relative to the phosphor strips. This type of color television display tube has already been used. However, during the manufacture a number of problems occur in particular as regards the provision of the said phosphor pattern which is to comprise phosphor lines at a regular distance from each other and with a given continuous width. Tubes which have not been manufactured with small tolerances show picture defects so that the display quality is bad. The phosphor pattern is obtained by providing on the display screen a layer which comprises photosensitive material, after which exposure to light is carried out through the color selection electrode arranged in front of the layer by means of a light source positioned in a very particular place and having a very defined length and light distribution as a function of the place, succeeded by development and fixing. The said light source usually consists of a high pressure metal vapor discharge lamp as described in the first paragraph. This has for its drawback, however, that the light distribution leaves to be desired as a result of undesired reflections at parts of the lamp itself and the envelope.

Another drawback is that the cylindrical mirror has to be aligned again after the metal vapour discharge lamp has been replaced. Rapid displacement is hence not possible and the production process is delayed.

It is the object of the invention to avoid all these drawbacks and to provide a liquid-cooled high pressure metal vapor discharge lamp which is particularly suitable for use in exposure devices for manufacturing color television tubes having a striped phosphor pattern.

Another object of the invention is to provide a liquid-cooled high pressure metal vapor discharge lamp which can easily be replaced without many adjusting operations.

Still another object of the invention is to provide a liquid-cooled high-pressure metal vapor discharge lamp in which a desired light distribution as a function of the place can be obtained in a simple manner and without the introduction of undesired light reflections.

The fourth object of the invention is to provide a method of manufacturing a color television display tube in which such a lamp is used.

According to the invention, a liquid-cooled high-pressure metal vapor discharge lamp of the kind mentioned in the first paragraph is wherein the said cooling jacket is formed by a tubular envelope, preferably manufactured from quartz, around the discharge tube, the said cylindrical mirror consisting of a thin metal layer on a part of the inside of the said tubular envelope.

A great advantage is that the mirror may be very thin, for example, by vapor deposition or electroless plating, so that the end faces of the metal layer near the apertures in the metal layer through which the light emanates cause substantially no undesired reflections. Since the mirror is provided on the inside of the wall of the envelope it has sufficient mechanical rigidity. The reflecting metal layer, however, may be deposited only on the inner surface of the envelope. Should the metal layer be deposited on the outside of the envelope, it would burn in contact with the air.

Dutch Pat. No. 2660 describes a filament lamp for projection purposes having a metal layer (silver) on the wall of the glass envelope. Such a metal layer is impossible inside the discharge tube of a high pressure metal vapor discharge lamp since it constitutes a short circuit for the discharge. In addition, undesired reflections would nevertheless occur at the envelope around the discharge tube. This is the case also when the metal layer would be provided on the outer wall of the discharge tube but inside the cooling jacket. The cooling liquid may be chosen to be so that much thermal radiation is absorbed. In a construction according to the invention light rays reflected by the metal layer are filtered several times. As a result of this the lamp will radiate little thermal energy. When such a lamp is used in a device for exposing color television display screens, the shadow mask will hence not become warm and hence not deform during the exposure (shadow mask = color selection electrode).

The desired light intensity distribution in a given place obtained with the said high-pressure metal vapor discharge lamp is obtained as a result of the shape of one or more apertures in the metal layer.

A rectangular aperture by which a suitable elongate light source is obtained will usually suffice. Good results are obtained with a metal layer on the envelope which is not thicker than 5 μum. Substantially no reflections occur at the end faces around the apertures in the mirror.

Figure 2:
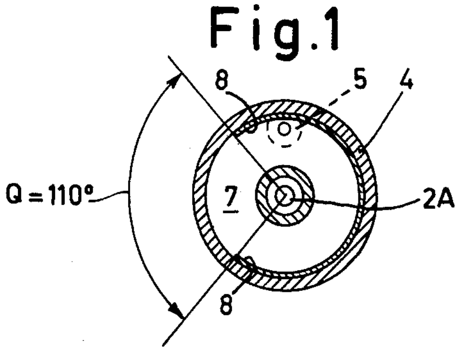
Figure 3:
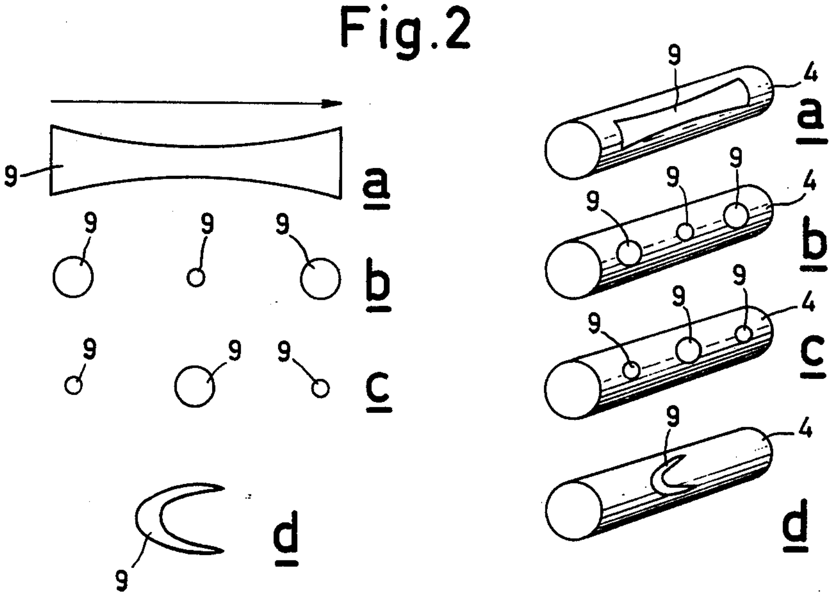
Figure 4:
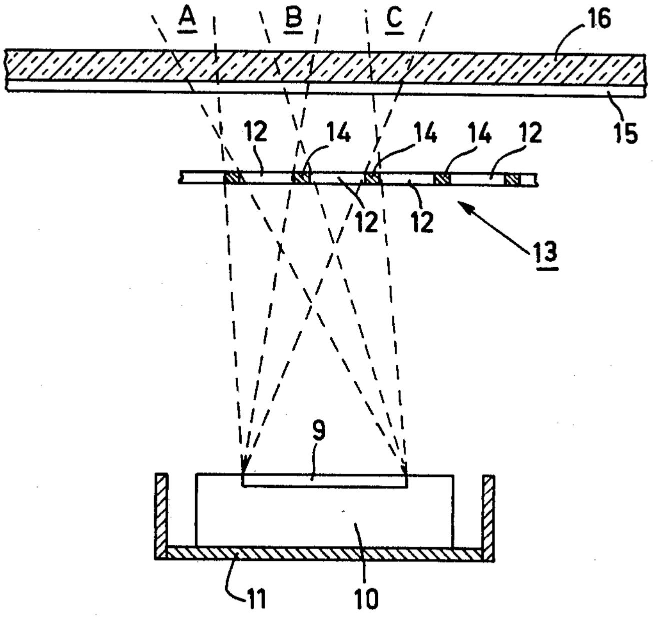

The invention will now be described in greater detail with reference to the accompanying drawing, in which FIG. 1 is a longitudinal sectional view of an embodiment of a liquid-cooled high-pressure metal vapor discharge lamp according to the invention, FIG. 2 is a cross-sectional view of said lamp, FIG. 3 shows a number of shapes of apertures in the metal layer, and FIG. 4 shows diagrammatically the exposure to light during the manufacture of color television display tubes by means of said lamp.

FIG. 1 is a longitudinal sectional view of an embodiment of a metal vapor discharge lamp according to the invention. The discharge space 1 comprises mercury vapor and two tungsten electrodes 2A and 2B which are sealed in the quartz discharge tube 3. The discharge space 1 furthermore comprises an inert gas, for example, argon, xenon. The discharge space 1 has the form of a cylinder and the length (≈5 mm) is significantly larger than the diameter (≈1 to 2 mm). A quartz envelope 4 is sealed around the discharge tube 3 and has an inlet aperture 5 and an outlet aperture 6 for the cooling liquid which circulates through the space 7. The quartz envelope 4 may also be secured to the discharge tube by means of O-ring seals. Provided on the inside of the envelope is a less than 5 μ thick metal layer 8 which forms a mirror having a rectangular aperture 9 (broken lines) through which the light rays emanate.

FIG. 2 is a cross-sectional view taken on the line II–II of FIG. 1. The angle Q in this case is approximately 110 °.

The light distribution as a function of the place can be varied and be adapted to certain wishes by giving the aperture 9 in the metal layer 8 a shape of one of the possibilities as shown in FIG. 3. The arrow denotes the direction of the axis of the discharge tube. In *d* a slot is shown as is described in the Netherlands Patent Application No. 7,114,113, as a result of which a quasi-punctiform part of the light source is visible from a place on the display screen. The shape of the slot is such that the quasi-punctiform part on the light source varies its place as a function of the place on the display screen. This variation in place is part of the variation in place of the virtual light source which is necessary in connection with the shaft of the deflection point in the operating tube. The other part of said variation in place is obtained by using a correction lens between the light source and the display screen as is described in the Dutch Patent Application No. 7,114,113.

FIG. 4 shows diagrammatically the exposure by means of a high pressure metal vapor discharge lamp during the manufacture of a color television display tube.

The mercury vapor discharge lamp 10 is present in a lamp housing 11. The rectangular aperture 9 in the metal layer extends parallel to the rows of long narrow apertures 12 in the color selection electrode 13. The aperture 9 has such a length that the contributions of the light rays through the long narrow apertures 12 in the color selection electrode 13 in the regions A, B and C is so large that no shadows of the bridges 14 become visible and a continuous substantially uniform phosphor strip 15 is obtained on the display window.

What is claimed is

1. A liquid-cooled high pressure metal vapor discharge lamp comprising a discharge tube surrounded by a cooling jacket having an inlet aperture and an outlet aperture, a cylindrical mirror disposed inside said cooling jacket around the axis of the discharge tube, said cooling jacket being a tubular envelope preferably manufactured from quartz around the discharge tube, said cylindrical mirror consisting of a thin metal layer on a part of inside of said tubular envelope.

2. A liquid-cooled high pressure metal vapor discharge lamp as claimed in claim 1, wherein the light intensity distribution of the said metal vapor discharge lamp for each location is obtained by the shape of one or more apertures in said metal layer through which the light rays of the discharge tube emanate.

3. A liquid-cooled high pressure metal vapor discharge lamp as claimed in claim 2, wherein said metal layer has a rectangular aperture having two sides longer than two other sides, said longer sides of the rectangle being parallel to the axis of said discharge tube.

4. A liquid-cooled high pressure metal vapor discharge lamp as claimed in claim 1 wherein said metal layer is less than 5μm thick.

5. A method of manufacturing a cathode-ray tube of the shadow mask type for displaying colored pictures in which light of a lamp as claimed in claim 1 is projected via the shadow mask on a photo-sensitive layer, said layer being provided on a support on the display screen of the said tube.

6. A cathode-ray tube manufactured according to the method as claimed in claim 5.

* * * * *